United States Patent Office 3,427,454
Patented Feb. 11, 1969

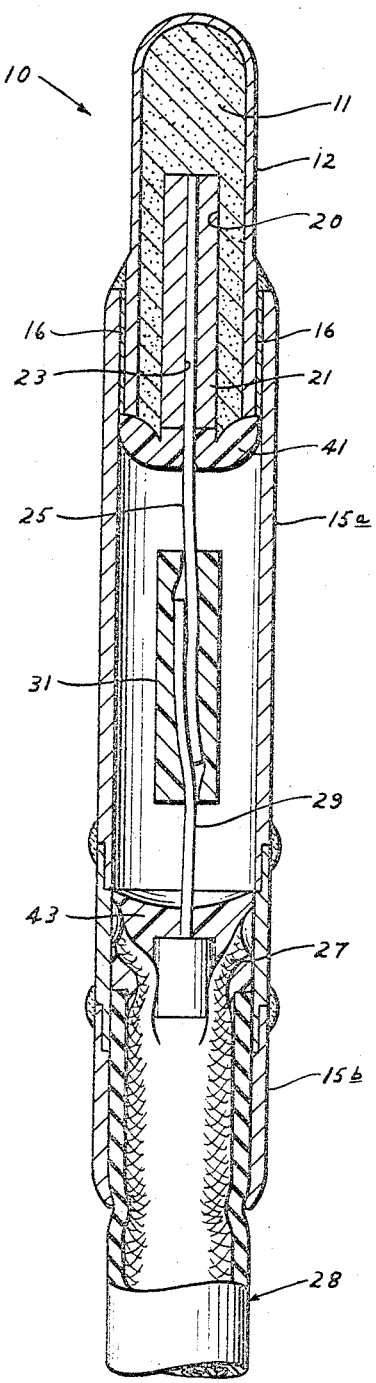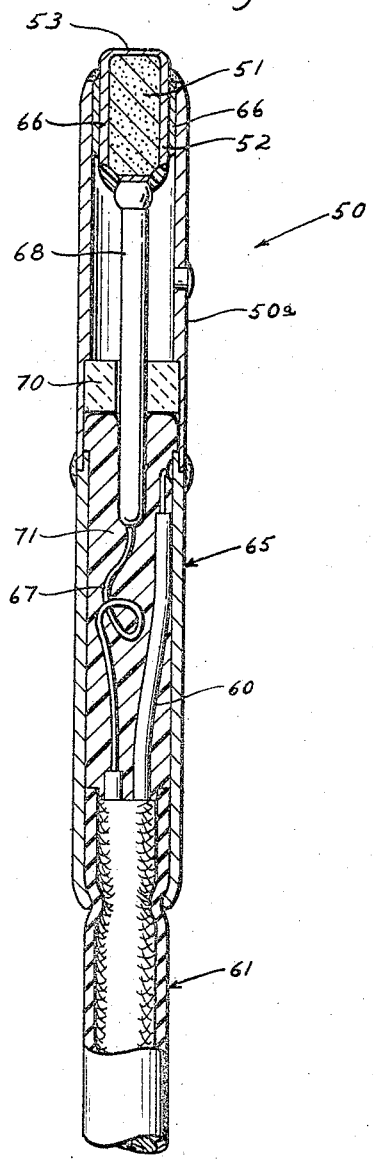
Fig. 1
Fig. 3
Fred P. Burns
Josef E. Friederichs
INVENTORS
BY
ATTORNEYS Fred P. Burns
Josef E. Friederichs
INVENTORS

3,427,454
BIOMEDICAL RADIATION DETECTING PROBE
James E. Webb, Administrator of the National Aeronautics and Space Administration with respect to an invention of Fred P. Burns and Josef E. Friederichs, Pacific Palisades, Calif.
Filed Dec. 23, 1965, Ser. No. 516,150
U.S. Cl. 250—83          3 Claims
Int. Cl. G01t 1/02

ABSTRACT OF THE DISCLOSURE

A biomedical nuclear radiation detecting probe for use in vivo comprising a semi-conductor diode of the junction type fabricated from high resistivity silicon crystal. The P-type conductivity crystal is bullet-shaped, and the junction is formed by diffusion of phosphorous over the nose end of the crystal. A silver casing is sleeved over the crystal with only the diffused nose of the crystal protruding therefrom. A miniature coaxial cable extends through the back of the casing in hermetic sealing relation therewith. The ground lead connects with the casing which is coupled to the N-type phosphorous. The bore of the casing adjacent the electrical connection to the P-type region of the crystal is filled with a non-oxidizing gas. For operation, a reverse voltage bias is applied to the P-N junction whereby penetrating radiation gives rise to voltage pulses which are conductible by the cable to appropriate recording apparatus.

---

The invention described herein was made in the performance of work under a NASA contract and is subject to the provisions of Section 305 of the National Aeronautics and Space Act of 1958, Public Law 85–568 (72 Stat. 435, 42 U.S.C. 2457).

This invention relates to a medical detecting probe and more particularly to a semiconductor nuclear radiation detector and to methods of fabricating the same.

In the fields of medical and biological research there is need for a radiation dosimeter which can be used in vivo. As an example, in determining radiation damage to body tissues, a measurement of the incident radiation by external dosimeters does not accurately indicate dose level within the radiated cells because the greater radiation damage is caused by photoelectrons and knock-on protons. Consequently, in determining radiation damage, dosimeters are needed which can be used in vivo to provide realistic readings of the spatial and energy distributions of radiant electrons and protons. Such dosimeters are also needed to obtain measurements of the nature and concentration of radioactive tracers in the body when such methods are used for diagnosis or treatment.

There are a variety of radiation dosimeters in current use which operate in accordance with such well known principles as radiothermoluminescence, ionization of gases, photographic emulsion techniques, and others. These, however, are primarily adapted for use externally of the body and are unsatisfactory for use in vivo. Although chemical dosimeters have been proposed for use in vivo, these are able to measure the amount of energy absorbed, but do not indicate the rate of absorption or the number of particles absorbed, and are therefore only partially satisfactory. While semiconductor type detectors have been considered for use in vivo, many problems have precluded their development. Some of the difficult problems are the devising of a shape and structure which would make the detector suitable for insertion into the body, and packaging of the device in a manner suitable to protect the semiconductor junction from attack by body liquids. Other problems relate to the reduction of leakage currents in order to maintain a reasonable signal-to-noise ratio in the recording apparatus and the fabrication of the device in an economical and efficient manner.

The detector of this invention which has been devised to overcome these problems is in the form of a slim medical probe which is adapted for easy insertion into the body tissue. The detecting element of the probe is a semiconductor diode of the junction type which is fabricated from a high resistivity silicon crystal doped with P-type impurities. The crystal is shaped in the form of a bullet, and the P-N type junction in the crystal is formed by the diffusion of phosphorous over the nose and surface of the crystal. The crystal is supported by a silver casing which is sleeved over the crystal with the nose of the crystal protruding therefrom, and connects with the N-type phosphorous and the ground lead for the detector. The lead to the P-type silicon is disposed within the casing itself, and the two leads are formed into a miniature coaxial cable which extends through the back of the cylindrical casing in hermetic sealing relationship therewith. The additional hermetic seal which is provided between the crystal and silver casing and the provision of a cable insulation which is impervious to body fluids protect the junction from attack by body liquids. For operation of the probe, reverse bias is applied to the P-N junction, and radiation penetrating the junction gives rise to voltage pulses which are conducted to recording apparatus via the coaxial cable.

In an alternate embodiment suitable for a probe with less than 1 mm. diameter, the silicon crystal is provided with a flat detecting surface, and a twin conductor cable is used. The lead from the P-type silicon is a gold wire attached by thermocompression bonding. The noise level with this embodiment is normally higher than that of the rounded nose detector, but its smaller size lends it utility in special situations.

In fabricating the probe a silicon crystal doped with P-type impurities is shaped into bullet form for the bullet-shaped probe, or in the form of an elongate cylinder in an alternate embodiment of the probe, and a layer of phosphorous doping material is deeply diffused over the nose and sides of the crystal. The thick diffused layer is then removed from the crystal nose and a second phosphorous diffusion is applied to the nose to provide a thin window, as is necessary for detection of the heavier charged nuclear particles.

A layer of nickel is then plated over the deep phosphorous diffused layer on the sides of the crystal to provide attachment means for subsequently soldering the unit to the silver casing.

To connect an electrical lead to the detector, a small diameter bore is cut in an axial direction into the silicon bullet from the back surface thereof for reciving a tubular aluminum slug. A nickel wire inserted in the slug provides a lead from the detector. Aluminum is then alloyed into the back portion of the silicon bullet to form a P+ contact and the back of the bullet is etched to produce a junction with low leakage characteristics. Alternatively, the lead to the P-type silicon might be attached by first evaporating aluminum to the back surface of the silicon to provide an ohmic contact and then attaching a gold wire thereto by thermocompression bonding.

Other objects and many of the attendent advangtages of this invention will be readily appreciated as the same become better understood by reference to the following detailed description when considered in connection with the accompanying drawings in which like reference numerals designate like parts throughout the figures thereof and wherein:

FIG. 1 is a sectional view of a preferred embodiment of the medical probe of this invention;

FIG. 3 is a sectional view of an alternate embodiment of the medical probe of this invention.

Figure 2A:
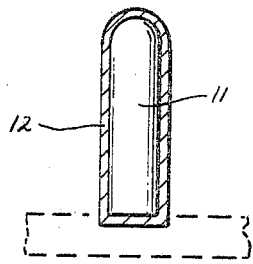
FIGS. 2A through 2H are schematic cross-sectional views showing the various steps used in fabrication of the silicon crystal as the nuclear radiation detecting element in the probe of FIG. 1.

Referring more particularly to the drawings, there is shown in FIG. 1 a medical probe 10 which is a preferred embodiment of this invention. The probe 10 comprises a semiconductor diode which is fabricated from a silicon crystal 11. The silicon crystal has a resistivity typically in the range of 3,500 to 5,000 ohm cm. and is doped with a P-type impurity such as gallium, or indium. The crystal is shaped into a bullet form and a P-N junction is formed by an even diffusion of phosporous 12 over the nose and the cylindrical surface of the crystal whereby the depletion region associated with the junction extends a uniform distance inwardly from the crystal surface over which the phosphorous is diffused. The crystal is supported by a cylindrical casing 15 which is sleeved part way over the crystal with the nose of the crystal protruding therefrom. An attachment means for a soldering connection between the casing and the crystal is provided by a nickel plating 16 which is laid over the phosphorous coating at the lower end of the silicon. The soldered connection results in a hermetic seal between the casing and the silicon which serves to protect the junction against attack by body acids and liquids. The casing is made of coin silver because of its machinability, ease of plating and soldering, and its demonstrated resistance to attack by body acids and body liquid.

To provide a lead from the P-type region of the detector, the crystal is provided with an axial bore 20 which extends axially into the silicon pellet from the bottom end thereof and receives an aluminum slug 21. The slug itself is tubular in form with an axial bore 23 into which a 16 mil diameter nickel wire 25 is inserted to provide a lead. The ground lead is provided by the silver casing which electrically connects with the N-type phosphorous and the braided shield 27 of a coaxial cable 28 which is inserted through the rear opening of the silver casing with its central wire 29 connected to the nickel lead 25, and 25, its braided shield soldered to the internal wall of the silver casing. The cable conducts voltage signals from the semiconductor detector to suitable amplifying and recording apparatus (not shown). The casing end is crimped inwardly to clamp the cable and improve the seal between the cable and casing. An insulating sleeve 31 is also placed over the junction of the cable conductor 29 and the nickel wire 25 to prevent possible grounding against the inner wall of the casing.

In operation of the device, a reverse bias is applied to the P-N junction which establishes an electric field across the junction and controls the depth of the depletion region. The positive space charge due to ionized donors in the phosphorus doped N-type region near the junction and the negative space charge due to ionized acceptors in the P-type region near the junction provide a distributed dipole layer which resembles the charged parallel-plate capacitor of the gas ionization chamber. A nuclear radiation particle, such as an alpha particle, passing through this space charge region produces electron-hole pairs by its inelastic collisions with the silicon atoms whereby these carriers which are swept apart by the electric field set up by the dipole layer give rise to an electrical pulse similar to that obtained in a gas ionization chamber.

There are notable differences, however, in the operation of a semiconductor detector and that of a gas ionization chamber. On the average, only 3.5 electron volts of incident particle energy are required to produce one electron hole pair in silicon, as compared to 32 electron volts for a typical gas. Furthermore, the high carrier mobilities and drift velocities in silicon, combined with the relative small width of the depletion region, result in pulses with millimicrosecond rise times as compared to a microsecond range for gas chambers. For these reasons, energy resolutions of the solid state detector show signal improvement over that which can be obtained with the gas ionization chamber. Also, the physical size of the silicon detector may be several orders of magnitude smaller than a gas ionization chamber since the range of energy particles in silicon is measurable in microns as compared to centimeters in a gas ionization chamber.

It is to be noted, however, that for a linear relationship to exist between the pulse height and particle energy it is necessary that the width of the depletion region in the semiconductor detector be greater than the range of the particle in the silicon so that the incident particle will lose all of its energy within the depletion region. For the P-N junction under consideration, the thickness of the depletion layer in microns has been determined to be proportional to the product $(PV)^{1/2}$ where P is the resistivity of the P region in ohm-centimeters, and V is the applied reverse bias voltage. From the above approximation it is apparent that the product should be made as large as possible when the detector is to be used as a spectrometer for penetrating particles such as protons and electrons.

The fabrication of a silicon crystal into a semiconductor diode which is usable with the medical probe of this invention is hereinafter described. A silicon crystal is selected for processing which has a resistivity in the range of 3,500 to 5,000 ohm cm. The crystal is doped with P-type impurities and the doped crystal is then sliced with a high speed diamond impregnated saw to form wafers approximately ¼ inch thick. The wafers are then diced, preferably by an ultrasonic impact grinder, to provide a number of cylindrical units of circular cross-section, each of which may then be shaped and processed to produce a suitable junction diode. The shaping of one of the cylindrical units of silicon is accomplished by placing the unit on a rotating fixture and rounding to bullet shape by applying emory cloth to one end of the cylinder as it is rotated about its longitudinal axis. The various steps in the fabrication of a bullet-shaped unit into a finished diode are illustrated in FIGURES 2A to 2F.

Figure 2B:
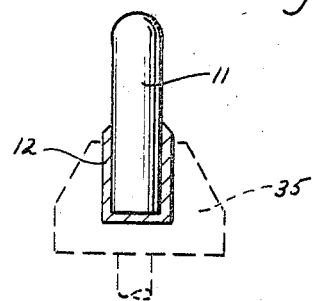
Figure 2C:
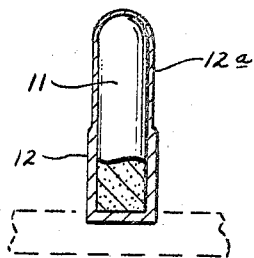

As shown in FIG. 2A, the bullet-shaped silicon 11 is deeply diffused with a layer of phosphorous doping material 12 by a diffusion process which is carried out for a period of sixteen hours at a temperature of 1,200° C. until the depth of diffusion is approximately 50 microns. Since a thick diffused layer is not desirable on the nose of the unit which is to be exposed to the radiation, the thick diffused layer is removed from the nose by etching, while a wax mask 35 is applied to the sides and rear of the unit, as shown in FIG. 2B. A second phosphorous diffusion is then carried out at a temperature of 1,050° C. until a diffused layer 12a of approximately one micron thickness is produced on the nose of the silicon, as shown in FIG. 2C, to provide a thin window which is necessary for the detection of the heavier charged nuclear particles such as alpha particles. The deep diffused layer provides the base for a soldering process hereinafter described.

Figure 2D:
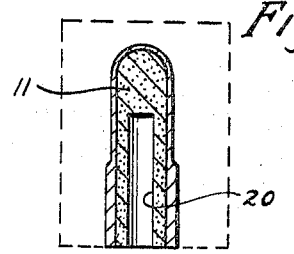
Figure 2E:
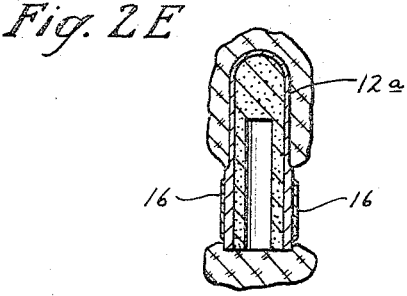
Figure 2F:
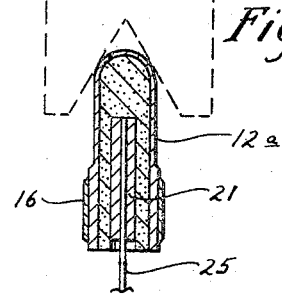

Following the rediffusion, the bottom end of the unit is lapped off to remove the deep diffusion layer, and the unit is then mounted in a chuck and a small diameter bore is cut by an ultrasonic cutter in an axial direction into the silicon bullet from the back surface thereof, as shown in FIG. 2D. The thin window and the back of the detector are then masked, as shown in FIG. 2E, and the nickel plating 16 is deposited over the deep phosphorous diffused layer to provide attachment means for subsequently soldering the unit to the silver case. A tubular aluminum slug 21 is then placed into the diced bore in the silicon bullet and a 16 mil diameter nickel wire 25 is inserted into the bore of the aluminum slug to provide a lead from the detector, as shown in FIG. 2F.

The bullet is then set into a special fixture and subjected to heating, whereby sintering of the nickel and alloying of the aluminum back contact are carried out at the same time. Preferably, during this process step the nickel wire is weighted down to insure adequate alloying during the heating cycle. When the temperature reaches 800° C., aluminum is alloyed into the back portion of the silicon bullet and nickel is sintered into the sides of the unit. The aluminum alloy forms a P+ contact and the sinter provides for greater adherence of the nickel to the silicon.

Figure 2G:
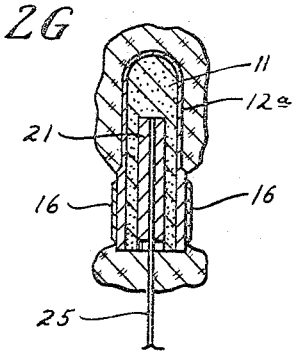
Figure 2H:
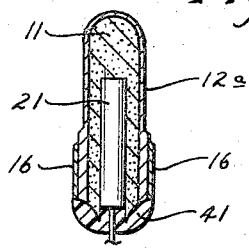

After the alloying and sintering, the nose and back of the bullet are again wax masked, as shown in FIG. 2G, and a second plate of electroless nickel is applied to the sides of the probe. The nickel plated area is then dipped into molten tin as a pre-tinning operation. To complete the semiconductor portion of the probe, the back end of the bullet is etched and protected with epoxy 41 to produce a junction with high voltage and low leakage characteristics.

Before inserting the silicon bullet into the silver case the entire bullet is dipped into molten tin preliminary to soldering the bullet to the case. Since the tin does not wet the nose of the bullet, soldering occurs only along the pre-tinned side regions, and a hermetically sealed joint is formed between the case and the silicon bullet. The subassembly, consisting of the bullet and the top of the case, is then leak tested by inserting the case into a Tygon tube having an inner diameter corresponding to the outer diameter of the bullet, and through which nitrogen under 25 pounds of pressure is introduced. Any leakage may then be readily observed by submerging the unit into a bath of methanol. If the unit is tight, the junction is coated with Dow Corning Silgard and cured at 125° C. for sixteen hours.

The diode is then tested for light sensitivity and the current-voltage characteristic is observed on a curve-tracer. For a suitable probe, the reverse characteristic must show low leakage and high voltage breakdown. The forward characteristic is also examined since the properties of the contacts to the silicon may be determined from its shape.

To complete assembly of the probe, the coaxial cable is inserted into the back section 15b of the case, with its braided shield soldered to the case and the insulated central wire left in an exposed condition for subsequent attachment to the nickel wire protruding from the back of the silicon bullet. The back part of the case is then filled with epoxy 43 and cured at room temperature for twelve hours to insure a rugged connection to the central wire of the cable and to prevent moisture from entering the case through the cable.

The subassembly comprising the back portion of the case is then leak tested in a manner similar to the testing described for the upper portion of the case, after which the unit is ready for final assembly. The ends of the central wire of the cable and the nickel wire from the silicon bullet are pre-tined and joined, using the Teflon tube 31 as insulation from the sides of the casing. The two subassemblies are then joined together by soldering the upper portion 15a of the casing to the section 15b, to complete assembly of the unit. With the silicon nose protected by means of silastic rubber, the case walls are pre-coated with .15 to .20 mil of copper and flashed with a thin film of gold. The completed assembly is then leak tested by dipping into boiling xylene. Examination of the current voltage characteristics of the unit before and after the boiling process reveals the tightness of the unit.

A modified form of the probe of this invention is shown in FIG. 3. In this probe 50 the silicon pellet 51 of P-type conductivity material is only 1 mm. in diameter. The noise level associated with this probe is normally higher than is characteristic of the rounded nose detector, but its smaller size lends it utility in special situations, as for example where a thin probe is necessary for insertion into small veins and arteries. The probe 50 is provided with a thick phosphorous diffusion layer 52 at the sides, and a thin layer 53 on the point of the probe. The ground lead 60 of the miniature cable 61 is grounded to the inner wall of the silver case 65 which supports the semiconductor pellet and electrically connects with the N-type material via nickel plating 66 applied on the sides of the pellet. The second conductor 67 of the cable connects with a gold wire lead 68 which is thermo-compression bonded to the base of the P-type silicon. The gold wire lead extends through an annular ceramic disc 70 mounted in the upper section 50a of the case 50. The case between the ceramic disc and its cable end is filled with epoxy 71, and with nitrogen between the disc and pellet to avoid oxidation effects. For the same reason the casing of the probe 10 may also be nitrogen filled, or filled with inert gas. It is also to be noted that although the probe 50 is shown with a planar type detecting region 53, it could also be made a rounded region, and preferably so for omnidirectional detection.

The fabrication of the probe 50 is substantially similar to that for the probe 10. The attachment of the lead to the P-type silicon, however, is accomplished by first evaporating aluminum to the back surface of the silicon to provide an ohmic contact, and then attaching a gold wire thereto by thermo-compression bonding. The junction region of the gold wire and the pellet is then etched and protected with epoxy.

It is to be noted that in using the probe 10 a nuclear radiation particle will see a depletion region whose depth will depend upon the particle's angle of incidence as well as the applied bias. Particular care should therefore be taken so that high energy particles will not penetrate the depletion region with a consequent marked reduction in resolution.

It is also to be noted that the probe described herein is designed to be an integral part of a coaxial cable so that input capacitance to the required signal amplifier will be held to a minimum, which in turn minimizes the noise resulting from the configuration.

Also, because of its shape the probe may be easily inserted into bodies without danger of breaking or chipping, and its sensitivity to radiation at various angles of incidence in terms of signal out and resolution is more uniform than is characteristic of a planar detector.

It will therefore be seen that a true internal dosimeter is described herein which will provide a realistic reading of beta, proton, and other nuclear particle energy, and a spatial distribution that is also realistic. The device is useful in evaluating blood flow problems by insertion into veins and arteries, and is also adaptable to being buried around an organ of the body, such as the brain, to measure the spatial and time pickup of radioactive tracers. Furthermore, in the method of fabrication of the device, the technique used for encapsulating the crystal with only its sensitive detecting area exposed provides for hermetic sealing which prevents degradation of the probe by hostile environments.

It should also be understood that the foregoing disclosure relates only to preferred embodiments of the invention and that it is intended to cover all changes and modifications of the examples in the invention herein chosen for the purposes of the disclosure and which do not constitute departure from the spirit and scope of the invention.

What is claimed and desired to be secured by Letters Patent is:

1. A medical probe for detecting nuclear radiation in vivo, said probe comprising:
    a semi-conductor diode of the junction type, said diode being formed from a silicon crystal of P-type conductivity having a substantially elongate cylindrical shape with a rounded end portion, said crystal including an N-type conductivity layer formed by the diffusion of a donor impurity material over the cylindrical surface and the rounded end of the silicon crystal to provide a P-N junction within said crystal, said diffusion being thinly spread over said rounded end of the crystal so as to provide a window for detection of the heavier nuclear particles;

an elongate tubular casing of electrically conductive corrosion-resistant material, said semi-conductor diode being mounted and supported in the bore of the tubular casing with only said thinly-spread diffusion layer at said one end of the crystal protruding from the casing;

connecting means providing an electrical connection and a hermetic seal between the casing and the N-type layer of the crystal;

an electrical cable extending into the bore of said tubular casing from the other end of said casing, with a hermetic seal formed between the cable and said other end of the casing, said cable comprising a pair of electrical conductors with one of said conductors electrically connected to the P-type region of the silicon crystal, and the other of said conductors in electrical contact with the tubular casing with the bore of said casing being filled with a non-oxidizing gas, whereby said probe constitutes an integral extension of said cable, and when said conductors are connected to a voltage source and reverse voltage bias applied to said junction said probe is capable of generating electric voltage signals upon penetration of the P-N junction by nuclear radiation, which signals are conductible by said cable to appropriate recording apparatus.

2. A medical nuclear radiation detecting probe as described in claim 1, wherein said miniature cable is covered with a layer of insulating material which is chemically resistant to attack by body acids and liquids.

3. A medical nuclear radiation detecting probe as described in claim 1, wherein the N-type conductivity region of the crystal is formed by the diffusion of phosphorous.

References Cited

UNITED STATES PATENTS 2,806,145   9/1957   Cotty _____ 250—833

OTHER REFERENCES

Uses of Semiconductor Detectors in Health-Physics Monitoring, by A. R. Jones, from Nucleonics, October 1960, pp. 86, 88, 90, 91.

Thin Semiconductor Transmission-Counter System for Nuclear Particle Detection, by Elliott et al., from The Review of Scientific Instruments, July 1962, pp. 713, 714, 715.

ARCHIE R. BORCHELT, *Primary Examiner.*

U.S. Cl. X.R.

250—83.3; 128—2.1